United States Patent [19]

Amjad

[11] Patent Number: 4,895,658
[45] Date of Patent: Jan. 23, 1990

[54] MEMBRANE CLEANING COMPOSITIONS CONTAINING ACRYLIC POLYMER

[75] Inventor: Zahid Amjad, Avon Lake, Ohio

[73] Assignee: The B. F. Goodrich Company, Akron, Ohio

[21] Appl. No.: 61,921

[22] Filed: Jun. 15, 1987

[51] Int. Cl.$^4$ .............................. C02F 5/14; C11D 3/37
[52] U.S. Cl. ..................................... 210/636; 210/634; 252/174.23; 252/180; 252/181
[58] Field of Search ................... 252/174.23, 175, 180, 252/181, 697; 210/697, 698, 699, 700, 701, 636

[56] References Cited

U.S. PATENT DOCUMENTS

| | | | |
|---|---|---|---|
| 4,357,254 | 11/1982 | Kapiloff et al. | 252/181 |
| 4,386,005 | 5/1983 | Kapiloff et al. | 252/180 |
| 4,443,340 | 4/1984 | May et al. | 252/181 |
| 4,460,472 | 7/1984 | Kapiloff et al. | 252/180 |
| 4,496,470 | 1/1985 | Kapiloff et al. | 252/181 |
| 4,512,552 | 4/1985 | Katayama et al. | 252/181 |

FOREIGN PATENT DOCUMENTS

| | | | |
|---|---|---|---|
| 0013608 | 2/1978 | Japan | 252/174.23 |
| 2041295 | 2/1987 | Japan | 252/174.23 |

Primary Examiner—Paul Lieberman
Assistant Examiner—John F. McNally
Attorney, Agent, or Firm—George A. Kap; Nestor W. Shust

[57] ABSTRACT

This invention pertains to the use of certain acrylic polymers in conjunction with other materials which characterize cleaners of alkaline earth metal scales and metal oxides and hydroxides, particularly citric acid, malic acid, and oxalic acid. Amount of the acrylic polymer is up to 100%, preferably 20 to 80%, based on the weight of a cleaner composition which includes the acrylic polymer. Suitable acrylic polymers are selected from homopolymers of acrylic and methacrylic acids, salts thereof, a copolymers of acrylic and methacrylic acids and salts thereof with 5 to 50% of one or more copolymerizable monomers, the acrylic polymers have molecular weight ($M_W$) of 500 to 100,000.

11 Claims, No Drawings

MEMBRANE CLEANING COMPOSITIONS CONTAINING ACRYLIC POLYMER

BACKGROUND OF THE INVENTION

Removal of organic and mineral deposits from solid surfaces has been accomplished in the past with limited success. This, of course, includes removal of organic and mineral deposits from semipermeable membranes which are used in reverse osmosis systems to purify water and in electrodialysis.

Osmosis concept is based on the use of a semipermeable membrane which is semipermeable to water but which rejects certain dissolved salts. If pure water is separated from a salt solution by a semipermeable membrane, water will flow through the membrane from the pure water side to the impure water side or from dilute solution side to the more concentrated solution. This results in diluting the more concentrated solution and such process continues until osmotic equilibrium is reached at which point, osmotic pressure or solution concentration on both sides of the membrane is about equal.

It is known, however, that if positive pressure is applied to the salt solution sufficient to overcome the osmotic pressure, the flow will be reversed and water will flow from the salt solution through the membrane to the pure water side. This is what is meant by reverse osmosis. To accomplish this, pressure of 600 to 800 psi is usually applied to the feedwater side in order to reverse the flow of water to the pure water or product water side. Product water is 95 to 99% free of dissolved material. Such pressures are generally used to purify saline water by forcing the water through the membrane which rejects minerals.

The semipermeable membranes are generally thin and delicate. They can be supported on spongy or foamed matrix to provide mechanical support for the membrane. Such matrices have open cells which allow passage of water or liquid. Semipermeable membranes are made from any suitable material such as cellulose acetate, cellulose triacetate, a polyamide, or a polysulfone.

Electrodialysis is an electrochemical separation process in which salts that are dissolved in water are forced through ion selective membranes under the influence of an applied electric field. The net result of this dialytic process is the transfer of ions from a less concentrated solution to a more concentrated solution. Electrodialysis reversal is simply an electrodialysis process in which the polarity of the applied direct current potential is automatically reversed at regular 15 to 30 minute intervals. Polarity reversal changes the direction of ion movement within the membrane stack.

Operational limitations on unidirectional membrane processes are imposed by the chemistry of the concentrate or brine stream. Long term, stable system performance is of critical importance for industrial operations and municipal supplies. Membrane fouling and mineral scale formation radically degrade system performance. Typical pretreatment for unidirectional membrane processes includes presoftening or treatment of the feed water with acid and/or complexing agents such as polyphosphates. Such pretreatment and chemical feed requirements add the burdens of cost and waste treatment to the desalting process.

The continued efficiency of a reverse osmosis system or an electrodialysis system depends on the maintenance of the membrane in an unfouled condition. Probably the greatest problem experienced in the use of these systems is fouling of the membrane by scale. Typically, the membrane becomes fouled by scale build-up to a point where it must be replaced quite often. The cartridge containing the membrane must be removed and replaced by a clean cartridge. The used cartridge is then treated to remove scale. Obviously, it is desirable to prevent scale build-up or at least, prolong the time between cartridge changes. This is ordinarily done by injecting certain chemical additives to the impure water, which are used for the purpose of preventing the build-up of foulants.

Cleaning of the membrane can be made in place whereby the piping is provided to allow for recirculation of a cleaner solution. In this fashion, valves are manipulated to allow for recirculation of the cleaner solution through the membrane until the membrane is cleaned to the point where it can be returned into a reverse osmosis system. In some commercially operating systems, a membrane cartridge is removed and placed in a cleaner mode where a cleaner solution is recirculated through the membrane in the cartridge until the membrane is sufficiently clean for reuse. In either case, a cleaning solution is prepared which is capable of removing scale and other foulants from the membrane. Also, in some situations, an additive can be added to infeed water to prevent or reduce formation of foulants which, otherwise, would deposit on the membrane and thus clog it.

U.S. Pat. No. 4,357,254 describes various prior art which generally relates to removal of calcium and magnesium scale. That patent itself is directed to compositions for cleaning solid surfaces and reverse osmosis membranes for removal of calcium, magnesium and iron scale. The iron scale is generally iron oxide which is primarily formed by the use of steel pipes or fittings which gradually raise the level of ferrous iron in water. The ferrous iron is then oxidized by dissolved oxygen to form ferric iron which hydrolyzes to ferric oxide or hydroxide which deposits on the membrane. Ferrous iron can also enter via the feedwater.

For cleaning reverse osmosis membranes containing little or no iron scale, U.S. Pat. No. 4,357,254 discloses compositions comprisimg a monobasic or dibasic sodium phosphate, citric acid, malic acid, and a nonionic surfactant. Citric and/or malic acids are used in amount of at least 20%. That patent also discloses that in reverse osmosis systems where there is a significant amount of iron oxide scale, oxalic acid should also be included. Such compositions are effective for cleaning fouled reverse osmosis membranes by dissolving and dispersing organic and mineral deposits, which primarily are calcium and magnesium scale as well as silicates and colloidal clay.

As is noted in U.S. Pat. No. 4,357,254, the disclosed composition is dissolved in water to a concentration of from about 0.1% by weight to about 5% by weight. Any concentration within that range will effectively clean the membrane, the primary effect of varying concentration being in the cleaning time. At a preferred concentration of about 2%, the average system can be cleaned in from ½ to 1 hour at about 25° C. As the concentration goes to the higher end of the range, the saving in cleaning time, due to the kinetics of the system, is not appreciably shortened over the ½ to 1 hour cleaning time at the preferred concentration of 2%. As the concentration goes to the low end of the range, the cleaning time can become inconveniently long. Even at the low end of the range, however, the capacity of the solution is more than adequate to effectively clean the membrane.

By means of another approach, the composition can be injected into the input water to provide 0.1 to 5000 ppm, preferably 1 to 50 ppm, for the purpose of maintaining the membrane in a relatively clean condition or to prolong the use of the membrane by keeping it cleaner longer. Pursuant to this approach, membranes are kept in operation for extended periods before they are cleaned or replaced.

U.S. Pat. No. 4,386,005 discloses the synergistic relationship of a low molecular weight polyacrylic acid and phytic acid compositions to reduce build-up of calcium, magnesium, and/or iron scale. In col. 3, this patent discloses pertinent prior art and the unique feature of iron scale which can damage the membrane by growth of crystals within the membrane.

U.S. Pat. No. 4,496,470, which is a c-i-p of U.S. Pat. No. 4,357,254, describes similar semipermeable membrane cleaner compositions as U.S. Pat. No. 4,357,254 but additionally discloses that sulfamic acid can be used in place of or in conjunction with citric acid and/or malic acid, i.e., weak organic acids. Sulfamic acid is also a weak organic acid.

U.S. Pat. No. 4,386,005 describes scale-inhibiting compositions of low molecular weight polyacrylic acids which are effective against calcium and magnesium scale to a point where cleaning of a semipermeable membrane is not necessary for several months. This patent also discloses that phytic acid is at least as effective as low molecular weight polyacrylic acid for inhibiting calcium and magnesium scale build-up on reverse osmosis membranes. Phytic acid is also very effective in inhibiting formation or deposition of iron scale on a reverse osmosis membrane where the feed water is saline or brackish.

SUMMARY OF THE INVENTION

This invention pertains to removal of organic and mineral deposits from solid surfaces, such as cleaning of semipermeable membranes used in reverse osmosis systems, using cleaning compositions and to the cleaning compositions themselves. The novel cleaning compositions are the cleaners for alkaline earth metal salts, oxides and hydroxides thereof containing one or more acrylic polymers in sufficient amount to inhibit precipitation of metal salts of active cleaning ingredients such as calcium fluoride, calcium oxalate, and the like.

DETAILED DESCRIPTION OF THE INVENTION

This invention pertains to the use of an acrylic polymer in cleaners for alkaline earth metal salts, alkaline earth metal oxides and hydroxides, for the purpose of making such cleaners more tolerant to hardness ions.

U.S. Pat. No. 4,375,254 describes a cleaner for silicates, colloidal clay and alkaline earth metal salts, particularly calcium carbonate, magnesium carbonate, calcium sulfate, barium sulfate and strontium sulfate. Such cleaners comprise 10–40% monobasic or dibasic sodium phosphate, 0–60% citric acid or 0–60% malic acid, and 0.1–5% of a nonionic surfactant. Total amount of citric and/or malic acid must be at least 20% and a suitable surfactant is a low-foaming nonionic surfactant, such as polyoxyethylene (12) tridecyl ether. Such cleaners are particularly effective in cleaning fouled reverse osmosis membranes.

The phosphates in the silicate cleaner compositions serve the dual purpose of cleaning as well as buffering the cleaning solution at a pH of about 2 to 4. The use of chelating agents, such as citric acid or malic acid, serves the dual function of dissolving alkali metal and alkaline earth metal salts, such as calcium and magnesium, and of preventing precipitation of phosphates caused by iron. The surfactant emulsifies organic materials and disperses inorganic solids. It is necessary to remove and emulsify solids, such as colloidal materials, in order to expose the scale which can then be removed by other ingredients in the cleaner composition.

While monobasic and dibasic sodium phosphates can be used in or be a part of the silicate cleaners, the corresponding potassium phosphates can be substituted. In the past, phosphoric acid was used in place of the monobasic and dibasic alkali metal salts. Also, while the preferred compositions contain both citric and malic acids, such compositions are also effective with only one of these acids.

A cleaner composition which is particularly adapted for removal of silica/silicate scales is based on ammonium bifluoride and/or alkali metal bifluoride, such as sodium bifluoride. Silica/silicate scales include divalent cation scales such as calcium silicate and magnesium silicate and trivalent silicate scales such as ferric silicate and aluminum silicate. Such compositions contain 10 to 50% ammonium bifluoride ($NH_4HF_2$) or an alkali metal bifluoride such as sodium bifluoride, 15 to 55% citric and/or malic acid, 15 to 55% monosodium and/or disodium phosphate or phosphoric acid, and 0.1 to 2% surfactant. This composition can also be further modified by the addition of malic acid in place of or in addition to the citric acid, and oxalic acid for iron scale solubilization or inhibition.

The prior art cleaners which are effective against alkaline earth metal salts but are not effective against silica/silicate salts are devoid of monobasic and dibasic alkali metal phosphates, phosphoric acid, ammonium or alkali metal bifluoride. Such cleaners are particularly effective in solubilizing and inhibiting formation of scales such as calcium carbonate.

The cleaning compositions described above are primarily useful for cleaning reverse osmosis membranes in systems where there is little or no iron scale. In a system where there is a significant amount of iron scale, oxalic acid is also included in amount of 5-30%.

The cleaning compositions of this invention are intended for use at an acid pH of about 2 to 4. A composition to be used at high pH can be used to clean membranes fouled with fats, oils and other organic matter. In such a case, an anionic surfactant would be used since such surfactants are effective on oils or oily deposits.

The cleaning composition useful herein can comprise wholly of the acrylic polymer, i.e., up to 100% of the acrylic polymer, preferably 20 to 80%, based on the weight of the composition itself.

Anionic or nonionic surfactants are suitable herein, although non-foaming or low-foaming nonionic surfactants are preferred. Mixtures of one or both can be used.

Typical low foaming nonionic surfactants are well known in the art and generally comprise the class of compounds formed by condensation of an alkyl phenol, an alkyl amine, or an aliphatic compound having a polyoxyethylene chain within the molecule, i.e., a chain composed of recurring ($-O-CH_2-CH_2-$) groups.

Many compounds of this type are known and used for their detergent, surface active, wetting and emulsifying properties. The surfactants of this type which are useful in the present invention are those produced by condensation of about 4–16 moles of ethylene oxide with 1 mole of a compound selected from the group consisting of (1) alkyl phenols having about 1–15 carbon atoms in the alkyl group; (2) alkyl amines having about 10–20 carbon atoms in the alkyl group; (3) aliphatic alcohols having about 10–20 carbon atoms in their molecules; and (4) hydrophobic polymers formed by condensing propylene oxide with propylene glycol. The nonionic surfactants used in the invention should have sufficient ethylene oxide units to insure solubility thereof in the detergent composition or in any dilution thereof which may be used in practice. Furthermore, the nonionic surfactants used in this invention must be low- or non-foaming.

I have described above two kinds of cleaners: one which is particularly effective against alkaline earth metal scales such as calcium and magnesium scales, and one which is particularly effective against silica/silicate scales, such as silicates of calcium, magnesium, aluminum, and iron. The alkaline earth metal cleaners are also effective against metal oxides and hydroxides such as iron, manganese and aluminum oxides and hydroxides. The cleaner composition which is particularly effective against alkaline earth metal scales and metal oxides and hydroxides, is based on at least one alkali metal phosphate and citric, malic, sulfamic acid, and/or oxalic acid whereas the cleaner composition which is particularly effective against silica/silicate scales, is based on ammonium or alkali metal bifluorides. For brevity, the first one will also be referred to hereinafter as an alkaline earth metal cleaner whereas the second one, as a silicate cleaner.

The problem with the known cleaners is their inability to produce desired results in the form of reduced deposition of organic and inorganic matter on membranes. Although the known cleaner compositions, which contain one or more weak organic acids such as citric acid, malic acid, oxalic acid, tartaric acid, ascorbic acid, and lactic acid are effective in solubilizing alkaline earth metal scales and metal oxides and hydroxides, such compositions lose effectiveness after a time, about one-half hour or less, since even at low pH they start precipitating alkaline earth metal salts of citric acid, malic acid, oxalic acid and/or sulfamic acid, and other scales which are insoluble in water and which deposit on semipermeable membranes. Specific salts contemplated herein which can precipitate on a membrane include calcium citrate, calcium salts of malic acid, calcium oxalate, calcium sulfamate, and the like. This is an existing problem since it takes about one-half hour to one hour to clean a semipermeable membrane.

The invention herein pertains to extending the tolerance of the known cleaner compositions to precipitation of insoluble scales which deposit on semipermeable membranes. More specifically, the invention herein pertains to the use of one or more acrylic polymers with one or more ingredients of an alkaline earth metal cleaner for the purpose of preventing or inhibiting precipitation of alkaline earth metal salts such as calcium oxalate, calcium citrate, calcium salt of malic acid, and the like. Since it takes at least one-half hour to one hour to clean a semipermeable membrane in a cleaning mode, precipitation of insoluble scales must be delayed or deferred at least one hour after the membrane is brought into contact with a cleaning composition.

It was discovered that the use of an acrylic polymer with ingredients which characterize the alkaline earth metal cleaners and metal oxide and hydroxide cleaners can reduce or delay precipitation substantially and thus maintain salts in solution which would normally precipitate out in absence of such acrylic polymers. Effectiveness of the cleaner compositions containing one or more of the acrylic polymers is limited to the acid or low pH side below neutral pH of 7, preferably to pH of 2 to 4.

Suitable acrylic polymers for inhibiting precipitation of scales include homopolymers of a monounsaturated monocarboxylic acid containing 3 to 5 carbon atoms and copolymers thereof with up to 60% by weight, preferably 5 to 50% of one or more copolymerizable monomers. Preferred acids for use herein are acrylic acid, methacrylic acid, ethacrylic acid, and cyanoacrylic acid, especially acrylic acid. Such acrylic polymers have molecular weight in the range of 500 to 100,000 but preferably in the range of 1,000 to 50,000. Particularly suitable herein are homopolymers of acrylic acid having molecular weight of 1,000 to 20,000.

Suitable comonomers for copolymerization with one or more of the carboxylic acids include vinyl halides and vinylidene halides, such as vinyl chloride and vinylidene chloride; monounsaturated dicarboxylic acids containing 4 to 10 carbon atoms, such as fumaric and maleic acid; esters of $\alpha,\beta$-olefinically unsaturated carboxylic acids containing 4 to 12 carbon atoms and monounsaturated dicarboxylic acids containing 4 to 20 but preferably 4 to 12 carbon atoms, such as methyl acrylate, ethyl acrylate, 2-ethylhexyl acrylate, octyl acrylate, cyanoethyl acrylate, methyl methacrylate, butyl methacrylate, hydroxypropyl methacrylate, ethyl maleate, butyl fumarate, maleic dimethyl ester, maleic acid mono-(2-ethylhexyl) ester, fumaric acid diethyl ester, and fumaric acid dilauryl ester; $\alpha,\beta$-olefinically unsaturated nitriles containing 3 to 5 carbon atoms, such as acrylonitrile and methacrylonitrile; acrylamides derived from acrylic and methacrylic acids and their N-substituted and N-alkylol and N-alkoxyalkyl derivatives containing 3 to 20 but preferably 3 to 12 carbon atoms, such as acrylamide itself, N-methylol acrylamide, N-butoxy methacrylamide, methacrylamide, N-octyl acrylamide, diacetone acrylamide, and hydroxymethyl diacetone acrylamide; vinyl ethers containing 3 to 22 carbon atoms, such as ethyl vinyl ether, chloroethyl vinyl ether, isobutyl vinyl ether, cetyl vinyl ether, and lauryl vinyl ether; vinyl ketones containing 4 to 12 carbon atoms, such as methyl vinyl ketone; vinyl esters of carboxylic acids containing 3 to 22 carbon atoms, such as vinyl acetate, vinyl propionate, vinyl formate, vinyl stearate, vinyl benzoate, and vinyl and allyl chloroacetate; $\alpha$-olefins containing 2 to 12 carbon atoms, such as ethylene, propylene, isobutylene, and butene-1; styrene and styrene derivatives such as $\alpha$-methyl styrene, vinyl toluene, and chlorostyrene; and other monomers such as vinyl naphthalene, vinyl pyridine, and allyl pentaerythritol. Included herein are substituted acrylamide containing functional groups such as hydroxyl, keto, carboxyl, sulfo, aryl, phosphonic, and halogen groups.

Representative examples of alkaline earth metal cleaners and metal oxide and hydroxide cleaners of this invention are illustrated below, in weight percent:

|  | broad range | preferred range |
|---|---|---|
| citric acid and/or oxalic acid | 0–90 | 20–80 |
| acrylic polymer | 10–100 | 20–80 |
| surfactant | 0–2 | 0.1–1 |

The cleaning compositions can be shipped in concentrated forms, whether solid or liquid, and then diluted with water at the site of use. Cleaning compositions ready for use are normally liquid solutions. Such compositions diluted in water to the extent of 2 to 5% concentration, can be used in recirculating water streams to clean semipermeable and ion-selective membranes. Also, such cleaning compositions can be added to the infeed stream in amount of 0.1 to 5000 ppm, preferably 1–50 ppm, to that the treated water would be passed through the semipermeable membrane and thus keep foulants to a minimum whereby cleaning of the membrane would be needed less frequently.

The invention is more specifically demonstrated by examples which follows:

EXAMPLE I

This example demonstrates effectiveness of the acrylic polymer dissolving agents to solubilize and maintain calcium in solution.

In these experiments, 3.0 grams of calcium carbonate was added to 100 ml of distilled water containing 5.0 grams of a dissolving agent. The resulting slurry was then stirred with a magnetic stirring bar at a constant rate of about 450 revolutions per minute. During the course of reaction, samples were withdrawn at known time, filtered through a 0.22 micron filter and the filtrate was analyzed for calcium by standard ethylenediaminetetraacetic acid (EDRA) titration. The initial pH of the slurry was acidic. The data is presented in Table A, below:

TABLE A

| Dissolving Agent | Comp. Wt. % | Polymer Mol. Mw | Ca (ppm) × $10^2$ @ Time (min.) | | | |
|---|---|---|---|---|---|---|
|  |  |  | 60 | 90 | 120 | 180 |
| PAA | 100 | 1,000 | 70 | — | 77 | — |
| PAA | 100 | 2,100 | 75 | 80 | 85 | 89 |
| PAA | 100 | 2,600 | 68 | 73 | 76 | 79 |
| PAA | 100 | 5,100 | 62 | 62 | 62 | 64 |
| PAA | 100 | 5,800 | 76 | 82 | 85 | 89 |
| PAA | 100 | 20,000 | 43 | 43 | 41 | 40 |
| PMAA | 100 | 22,000 | 24 | 24 | 23 | 23 |
| AA:tBuAm | 80:20 | 3,000 | 68 | 71 | 74 | 76 |
| AA:tBuAm | 80:20 | 6,000 | 81 | 84 | 86 | 90 |
| AA:tBuAm | 80:20 | 14,400 | 81 | 85 | 87 | 89 |
| AA:tBuAm | 80:20 | 25,400 | 81 | 86 | 87 | 91 |
| AA:MAA:tBuAm | 60:20:20 | 10,000 | 71 | 76 | 80 | 84 |
| AA:MAA:tBuAm | 70:10:20 | 6,000 | 44 | — | 46 | — |
| PAA[1] | — | 6,000 | 67 | 72 | 76 | 80 |
| AA:AMPS | 80:20 | 10,000 | 80 | 80 | 79 | 77 |
| AA:HPA | 63:37 | 7,000 | 32 | 33 | 33 | 34 |
| Citric Acid | 100 | — | 27 | 22 | — | 20 |
| Citric Acid:PAA | 80:20 | 6,000 | 106 | 18 | 20 | 20 |
| Citric Acid:PAA | 20:80 | 6,000 | 79 | 85 | 87 | 93 |
| Citric Acid:PAA | 50:50 | 2,100 | 80 | 81 | 91 | 46 |

In the above Table A, the following contractions appear:

| | |
|---|---|
| AA | —acrylic acid |
| PAA | —polyacrylic acid |
| AMPS | —2-acrylamido-2-methylpropane sulfonic acid |
| MAA | —methacrylic acid |
| PMAA | —polymethacrylic acid |
| HPA | —hydroxypropyl acrylate |
| tBuAm | —tertiary butyl acrylonide |
| PAA[1] | —polyacrylic acid containing phosphino groups |

In the last experiment, 2.5 grams of citric acid and 2.5 grams of polyacrylic acid of weight average molecular weight of 2,100, were used.

Results presented in Table A show the effectiveness of homopolymers and copolymers of acrylic acid.

EXAMPLE II

This example demonstrates the effect of an acrylic polymer dissolving agent on amount of solubilized phosphate and calcium in solution after a time of 0 to 60 minutes.

Pursuant to the procedure herein, 0.42 gram of tricalcium phosphate was added to 100 ml of distilled water containing the indicated amount of the dissolving agent. The resulting slurry was stirred with a magnetic stirring bar at a constant rate of about 400 revolutions per minute. During the course of reaction, samples were withdrawn at a predetermined time, filtered through a 0.22 micron filter paper, and analyzed for calcium and phosphate by atomic absorption spectroscopy and spectrophotometrically, respectively. Results are given in Table B, below:

TABLE B

| Dissolving Agent | Comp. Wt. % | Mol. Mw | Amount Wt. % | Phosphate (ppm) in Soln. | | Ca (ppm) |
|---|---|---|---|---|---|---|
|  |  |  |  | 30 Min. | 60 Min. | 60 Min. |
| None | — | — | — | 3.4 | — | 2.2 |
| PAA | 100 | 5,100 | 1.0 | 855 | 965 | 749 |
| PAA | 100 | 5,100 | 1.5 | 1,200 | — | — |
| PAA | 100 | 2,100 | 1.0 | 1,080 | 1,145 | 808 |
| PAA | 100 | 1,000 | 1.0 | 1,088 | 1,160 | 840 |
| AA:tBuAm | 80:20 | 3,000 | 1.0 | 840 | 860 | 598 |
| AA:MAA:tBuAM | 60:20:20 | 10,000 | 1.0 | 848 | — | — |
| AA:CA:Am | 75:16:9 | 6,000 | 1.0 | 525 | — | 385* |
| AA:MA | NA | 2,500 | 0.3 | 845 | — | — |
| AA:MA | NA | 2,500 | 0.5 | 1,305 | — | — |
| AA:MA | NA | 2,500 | 1.0 | 1,930 | — | 1,409 |
| PMA | 100 | 1,000 | 1.0 | 1,765 | 1,915 | 1,366 |

The following contractions appear in the above Table B:

PAA —polyacrylic acid
AA —acrylic acid
MAA —methacrylic acid
tBuAm —tertiary butyl acrylamide
CA —carbitol acrylate
MA —maleic anhydride or acid
Am —acrylamide Results in Table B demonstrate effectiveness homopolymers and copolymers of acrylic acid.

I claim:

1. A composition for cleaning a semipermeable membrane comprising 20 to 80% by weight, based on the weight of total composition, of a weak organic acid and 20 to 80% by weight, based on the weight of total composition of an acrylic polymer selected from the group consisting essentially of copolymers of acrylic acid or its salt with 5 to 50% by weight of a copolymerizable comonomer or a mixture of such comonomers, weight average molecular weight of said acrylic polymer is in the range of 500 to 100,000.

2. Composition of claim 1 wherein molecular weight of said acrylic polymer is 1,000 to 50,000; wherein said copolymerizable comonomer is selected from the group consisting essentially of N-substituted acrylamides containing 6 to 15 carbon atoms, lower alkyl acrylates containing 3 to 10 carbon atoms, hydroxyalkyl and alkoxy alkyl acrylates of 5 to 15 carbon atoms, acrylamidoalkyl sulfonic acids of 5 to 12 carbon atoms, and mixtures thereof.

3. Composition of claim 2 including 0.1 to 1% by weight of a low-foaming nonionic surfactant; wherein said weak organic acid is selected from the group consisting essentially of citric acid, malic acid, sulfamic acid, and mixtures thereof.

4. Composition of claim 3 which also includes 5–30% by weight of oxalic acid.

5. Composition consisting essentially of, on weight basis of said composition:

20–80% by weight of an acrylic polymer selected from copolymers of acrylic acid with 5 and 50% by weight of a copolymerizable monomer selected from the group consisting essentially of N-substituted acrylamides of 6–15 carbons, allyl acrylates of 3–10 carbons, hydroxyalkyl and alkoxyalkyl acrylates of 5–15 carbons, acrylamidoalkyl sulfonic acids of 5–12 carbons, and mixtures of such copolymerizable monomers;

20–80% by weight of an organic acid selected from the group consisting essentially of citric acid, malic acid, sulfamic acid, and mixtures thereof; and 0.1–1% of a low-foaming nonionic surfactant.

6. Composition of claim 5 also including 5–30% by weight of oxalic acid.

7. In a process for cleaning a membrane used in a water purification system wherein water under pressure is passed through said membrane comprising the step of contacting said membrane with a cleaner composition in water comprising 20 to 80% by weight, based on the weight of total composition of an acrylic polymer and 20 to 80% be weight, based on the weight of total composition of a weak organic acid or a mixture thereof; said acrylic polymer is selected from copolymers of acrylic acid or its salt with 5 to 50% by weight of one or more copolymerizable comonomers, weight average molecular weight ($M_W$) of said acrylic polymer is in the range of 500 to 100,000.

8. Process of claim 7 wherein molecular weight of said acrylic polymer is 1,000 to 50,000; wherein said copolymerizable comonomer is selected from the group consisting essentially of N-substituted acrylamides containing 6 to 15 carbon atoms, lower alkyl acrylates containing 3 to 10 carbon atoms, hydroxyalkyl and alkoxy alkyl acrylates of 5 to 15 carbon atoms, acrylamidoalkyl sulfonic acids of 5 and 12 carbon atoms, and mixtures thereof.

9. Process of claim 8 including 0.1 to 1% by weight of a low-foaming nonionic surfactant; wherein said organic acid is selected from the group consisting essentially of citric acid, malic acid, sulfamic acid, and mixtures thereof.

10. Process of claim 7 wherein said composition also includes 0.1 to 1% of a low-foaming nonionic surfactant; wherein said comonomer is selected from the group consisting essentially of N-substituted acrylamides of 6–15 carbons, allyl acrylates of 3–10 carbons, hydroxyalkyl and alkoxyalkyl acrylates of 5–15 carbons, acrylamidoalkyl sulfonic acids of 5–12 carbons, and mixtures of such copolymerizable monomers; wherein said organic acid is selected from the group consisting essentially of citric acid, malic acid, sulfamic acid, and mixtures thereof; wherein said membrane is made from the material selected from the group consisting essentially of cellulose acetate, cellulose triacetate, polyamides, polysulfones, and mixtures thereof; and wherein pH of the water entering said membrane is below 7.

11. Process of claim 10 wherein said cleaning composition is in water at a concentration of 0.1–5% by weight.

* * * * *